(12) United States Patent
Duncan et al.

(10) Patent No.: US 9,379,395 B2
(45) Date of Patent: Jun. 28, 2016

(54) ACTIVE CATHODE TEMPERATURE CONTROL FOR METAL-AIR BATTERIES

(71) Applicant: Elwha, LLC, Bellevue, WA (US)

(72) Inventors: William David Duncan, Kirkland, WA (US); Roderick A. Hyde, Redmond, WA (US)

(73) Assignee: ELWHA LLC, Bellevue, WA (US)

( * ) Notice: Subject to any disclaimer, the term of this patent is extended or adjusted under 35 U.S.C. 154(b) by 275 days.

(21) Appl. No.: 13/944,056

(22) Filed: Jul. 17, 2013

(65) Prior Publication Data

US 2015/0024286 A1    Jan. 22, 2015

(51) Int. Cl.
*H01M 8/04* (2016.01)
*H01M 12/06* (2006.01)
*H01M 10/60* (2014.01)
*H01M 10/63* (2014.01)
*H01M 10/65* (2014.01)

(52) U.S. Cl.
CPC ...... *H01M 8/04037* (2013.01); *H01M 8/04067* (2013.01); *H01M 8/04365* (2013.01); *H01M 8/04731* (2013.01); *H01M 12/06* (2013.01); *H01M 10/50* (2013.01); *H01M 10/502* (2013.01); *H01M 10/5034* (2013.01); *Y02E 60/50* (2013.01)

(58) Field of Classification Search
CPC  H01M 10/5034;  H01M 10/502;  H01M 10/50
See application file for complete search history.

(56) References Cited

U.S. PATENT DOCUMENTS

| 4,322,483 | A | 3/1982 | Tune |
|---|---|---|---|
| 5,415,949 | A | 5/1995 | Stone et al. |
| 5,571,630 | A | 11/1996 | Cheiky |
| 6,811,910 | B2 | 11/2004 | Tsai et al. |
| 2003/0017376 | A1 | 1/2003 | Tsai et al. |
| 2010/0261048 | A1 | 10/2010 | Kim et al. |
| 2010/0297487 | A1 | 11/2010 | Ryou et al. |
| 2011/0300420 | A1 | 12/2011 | Johnson, Jr. |
| 2011/0318656 | A1 | 12/2011 | Hago et al. |
| 2012/0222965 | A1 | 9/2012 | Bulan et al. |

FOREIGN PATENT DOCUMENTS

| JP | 2011-054329 A | 3/2011 |
|---|---|---|
| JP | 2011-096456 A | 5/2011 |
| KR | 2013-0014139 A | 2/2013 |

OTHER PUBLICATIONS

PCT International Search Report; International App. No. PCT/US2014/046864; Nov. 12, 2014; pp. 1-3.
Zinc Based Energy Systems, Zinc Benefits, Uses, Facts, Events & Programs—located at http://www.zinc.org/info/zinc_based_energy_systems, bearing a date of Apr. 22, 2015, 1 page, International Zinc Association.

*Primary Examiner* — Jane Rhee

(57) ABSTRACT

A metal-air battery is disclosed, including a cathode temperature controller that identifies a power-boosted operating temperature at which a projected power boost exceeds a projected battery lifetime penalty and a temperature regulator that adjusts the cathode temperature to the power-boosted operating temperature using power generated by the metal-air battery when the metal-air battery is in a discharge state.

45 Claims, 4 Drawing Sheets

ACTIVE CATHODE TEMPERATURE CONTROL FOR METAL-AIR BATTERIES

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

Priority Applications

NONE

Related Applications

U.S. patent application Ser. No. 13/944,060, entitled CATHODE TEMPERATURE REGULATION FOR METAL-AIR BATTERIES, naming William D. Duncan and Roderick A. Hyde as inventors, filed 17 Jul. 2013, is related to the present application.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

BACKGROUND

Power management for metal-air batteries can be complicated. Typically, power generation in a metal-air battery is strongly correlated with the catalytic processes at the cathode. Catalytic cycles may be affected by microscopic-level considerations, such as pore diffusion and catalytic active site activity, as well as bulk-scale considerations, such as temperature and pressure. Consequently, smooth, steady-state power delivery can be challenging during transient periods of battery operation and environmental change.

DETAILED DESCRIPTION OF PREFERRED EMBODIMENTS

A metal-air battery is an electrochemical power cell that includes a metal anode and an air permeable cathode. Metal-air batteries may be used in a wide variety of power storage applications, ranging from power generation applications (e.g., grid storage for wind farms), to vehicular use applications (e.g., automotive and locomotive), and portable electronic device applications (e.g., cell phones, mobile devices, and tablet computers).

The rate of electric power generation in a metal-air battery generally is positively correlated with the rate of a catalytic reaction at an oxygen-reduction catalyst in the cathode. Put another way, an increase in the rate of the catalytic reaction increases the rate at which electrons are liberated from the anode.

Some previous metal-air batteries have used externally powered heaters to alter chemical reactions at the cathode. However, external power supplies can be cumbersome, potentially adding weight and complexity. Moreover, thermal feedback mechanisms within the power cell can damage the catalyst. Excessive heat may sinter the catalyst particles, potentially reducing the catalytic activity of the cathode. Accordingly, embodiments of methods for adjusting the temperature of the cathode of a metal-air battery using current generated by the battery are disclosed herein.

Figure 1:
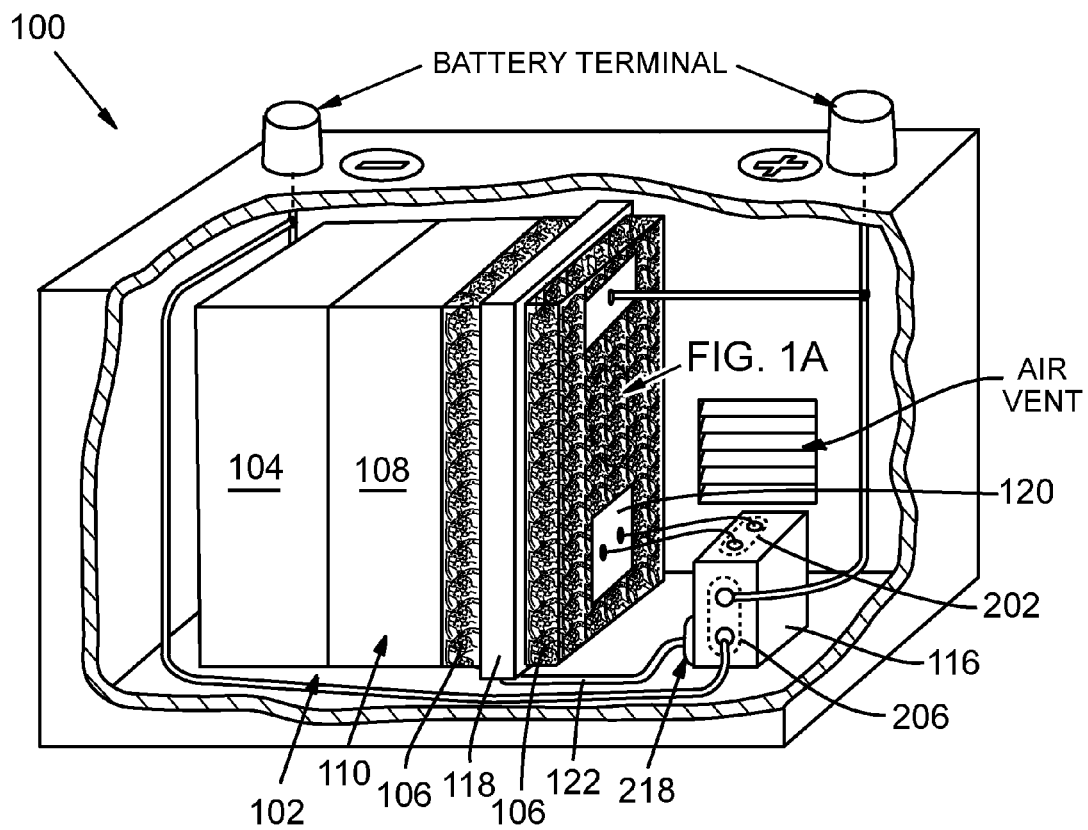
FIG. 1 is a perspective cutaway view showing an embodiment of a metal-air battery having a power cell and a cathode temperature regulator, energized by the power cell, for adjusting a temperature of the power cell cathode.

FIG. 1 is a perspective cutaway view showing an embodiment of a metal-air battery 100 having a power cell 102. Power cell 102 includes a metal anode 104 separated from an air-permeable cathode 106 by an electrolyte-permeable battery separator 108. During discharge, anode 104 is oxidized, forming metal cations and electrons. In some embodiments, anode 104 consists essentially of a pure metal. Non-limiting examples include alkali metals (e.g., lithium (Li) and sodium (Na)), alkaline earth metals (e.g., beryllium (Be) and calcium (Ca)), transition metals (e.g., iron (Fe), manganese (Mn), titanium (Ti), and zinc (Zn)), and Group 13 metals (e.g., aluminum (Al)).

An electrolyte 110 (e.g., a liquid or a solid-state material electrochemically coupling anode 104 with cathode 106) transports the metal cations across battery separator 108 to cathode 106. Battery separator 108 is positioned between and electrically isolates anode 104 from cathode 106 and is permeable to metal cations and to electrolyte 110. In some embodiments, battery separator 108 may include a polymer membrane that is selectively permeable to electrolyte 110, but that otherwise electrically isolates anode 104 from cathode 106 to prevent internal short-circuiting of power cell 102.

Figure 1A:
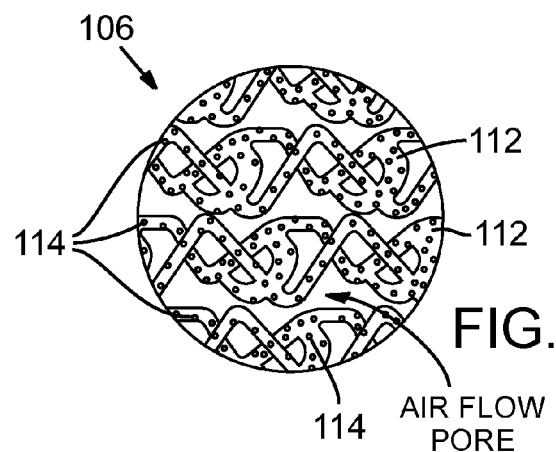
FIG. 1A is an enlarged fragmentary view of the power cell cathode shown in FIG. 1 showing an air-permeable catalyst support decorated with an oxygen-reduction catalyst.

Cathode 106 is porous, so that air permeating the cathode is exposed to active sites of an oxygen-reduction catalyst therein to promote the reduction of oxygen from the air by metal cations to form a metal oxide. For example, FIG. 1A is an enlarged fragmentary view of cathode 106 showing an air-permeable porous catalyst support 112 decorated with an oxygen-reduction catalyst 114. In some embodiments, catalyst support 112 may include porous carbon or porous metal oxide materials. In some embodiments, oxygen-reduction catalyst 114 may consist essentially of a pure metal catalyst. In some embodiments, oxygen-reduction catalyst 114 may include transition metal catalysts (e.g., manganese, cobalt (Co), ruthenium (Ru), platinum (Pt), silver (Ag), and/or gold (Au)).

The rate of a catalytic reaction at oxygen-reduction catalyst 114 is positively correlated with the rate of power generation in power cell 102. Thus, an increase or decrease in power generation may be achieved by heating or cooling cathode 106, and thus, catalyst 114, respectively. A temperature regulator 116 controls the temperature of cathode 106 by regulating heat exchange between cathode 106 and a heat transfer structure 118, described in more detail below. The energy used by temperature regulator 116 to adjust the temperature of cathode 106 is supplied by power cell 102. Put another way, during discharge of power cell 102, a portion of the current gathered from power cell 102 is used to power a heat exchange between cathode 106 and heat transfer structure 118, subject to regulation by temperature regulator 116.

Temperature regulator 116 adjusts the temperature of cathode 106 with reference to temperature data about cathode 106, and by extension, temperature information about catalyst 114. In the embodiment shown in FIG. 1 a cathode temperature sensor 120 is in thermal communication with cathode 106. In some embodiments, cathode temperature sensor 120 may include one or more bi-junction thermocouples located on and/or within cathode 106 to collect and transmit cathode temperature information to temperature regulator 116. For example, temperature sensor 120 may include an array of spaced apart temperature probes positioned on exterior surfaces of cathode 106 and/or buried within cathode 106 to measure the temperature of catalyst support 112 or catalyst 114, or both of them, and/or to measure the temperature of air in a pore or void within catalyst support 112.

Figure 2:
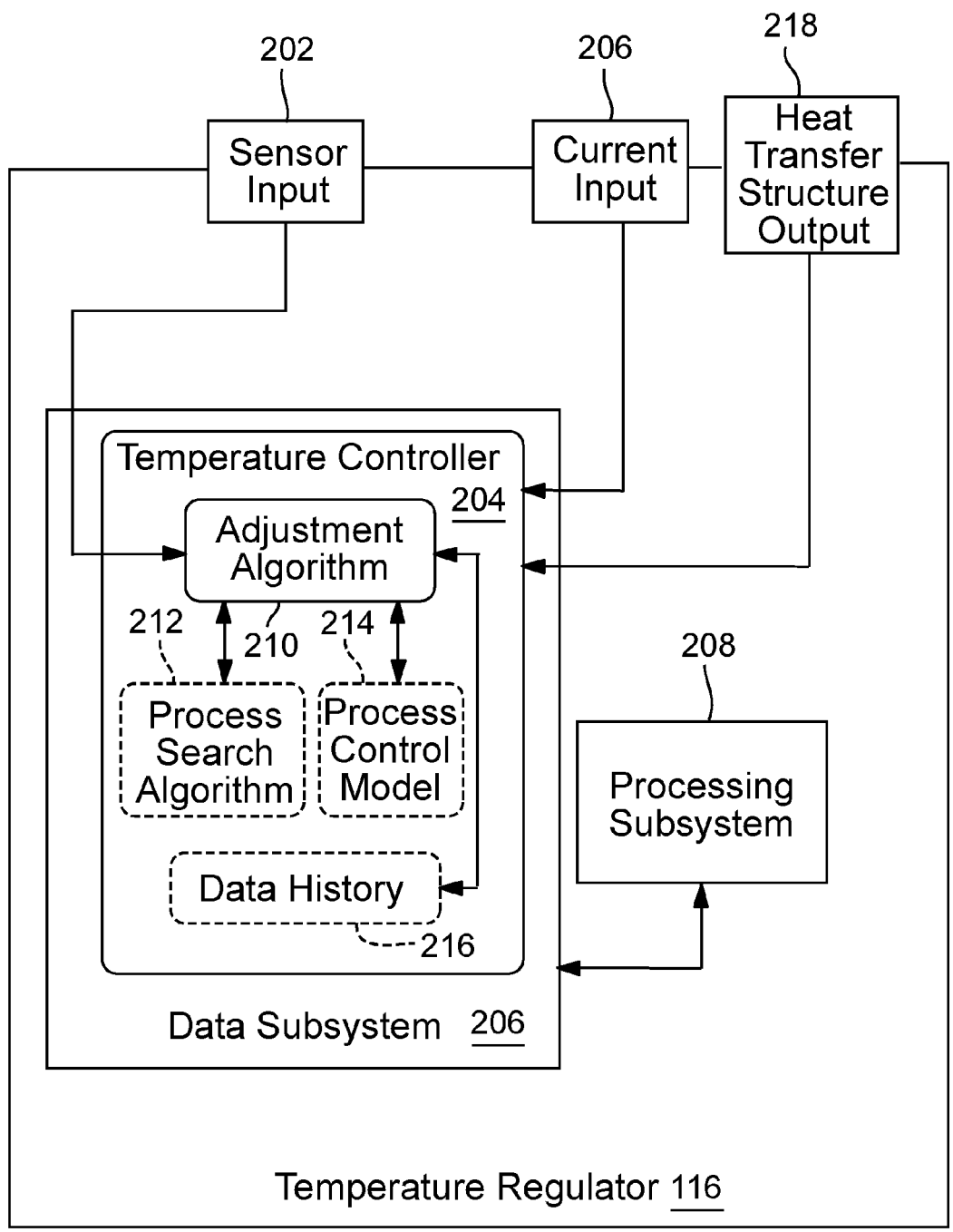
FIG. 2 is a schematic view of an embodiment of a cathode temperature regulator for use with a metal-air battery.

FIG. 2 is a schematic view of an embodiment of temperature regulator 116. In the embodiment shown in FIG. 2, cathode temperature data from temperature sensor 120 (FIG. 1) is received at a cathode temperature sensor input 202 in operative communication with a temperature controller 204. Temperature controller 204 also receives current supplied from power cell 102 (FIG. 1) through a current input 206, providing power to operate temperature regulator 116 and adjust the temperature of cathode 106 (FIG. 1) as well as providing battery electrical data, such as battery capacity, battery load current, and battery voltage information.

In the embodiment shown in FIG. 2, temperature controller 204 is instantiated (e.g., as software) in a data subsystem 206 that holds instructions executable by a processing subsystem 208 to operate, on a general level, temperature regulator 116. Data subsystem 206 may include any suitable hardware (e.g., solid state memory in one non-limiting example) for storing non-transitory instructions used by processing subsystem 208 (e.g., a logic processor in one non-limiting example) to perform the methods and algorithms and operate the hardware described herein. The boundary between hardware and software shown in FIG. 2 is provided only for illustrative purposes, and skilled persons will recognize that embodiments having other suitable divisions (if any division is provided at all) are possible.

In the embodiment of temperature regulator 116 shown in FIG. 2, battery electrical data and cathode temperature data are provided to an adjustment algorithm 208 for determining a new temperature for cathode 106 using power collected from power cell 102 (FIG. 1). Optionally, temperature controller 204 may include one or more process optimization algorithms 210 used to optimize a variable (e.g., a cathode temperature set point), including various linear and/or non-linear search techniques; one or more theoretically or empirically based process control models 214 used to operate and regulate a temperature controller output in response to a given input (e.g., in response to a cathode temperature set point, select proportional, integral, and derivative parameters to control cathode temperature to the set point); and/or a data history 216 including past battery data (e.g., data measurements and process control calculations).

Once the new temperature is identified by adjustment algorithm 208, it is used to operate temperature regulator 116 or heat transfer structure 118. In the embodiment shown in FIG. 1, heat transfer structure 118 is depicted as a solid phase thermal conductor in thermal contact with exterior sidewalls of cathode 106. While the embodiment of heat transfer structure 118 shown in FIG. 1 is in thermal contact with outer exterior walls of cathode 106, skilled persons will recognize that heat transfer structure 118 may envelope and/or penetrate cathode 106 in myriad arrangements to exchange heat therewith. Solid phase thermal conductors may be capable of actively (e.g., via thermoelectric heat transfer and/or resistive heat transfer) or passively (e.g., via a heat pipe and/or a refrigerated or heated non-electrolyte heat transfer fluid flow system) exchanging heat with cathode 106. In some embodiments, a single heat transfer structure 118 may include both heating and cooling elements. In some other embodiments, several heat transfer structures 118 may heat and/or cool cathode 106 separately.

In the embodiment shown in FIG. 1, heat exchange structure 118 is supplied with energy from temperature regulator 116 using a conduit 122. Conduit 122 may include convective or conductive heat transfer mechanisms (e.g., heat pipes or heat exchange fluid pipes) or electrical heat transfer mechanisms (e.g., current). Regardless of how energy is supplied to heat exchange structure 118, the energy is generated by power cell 102 and regulated by temperature regulator 116.

Figure 3A:
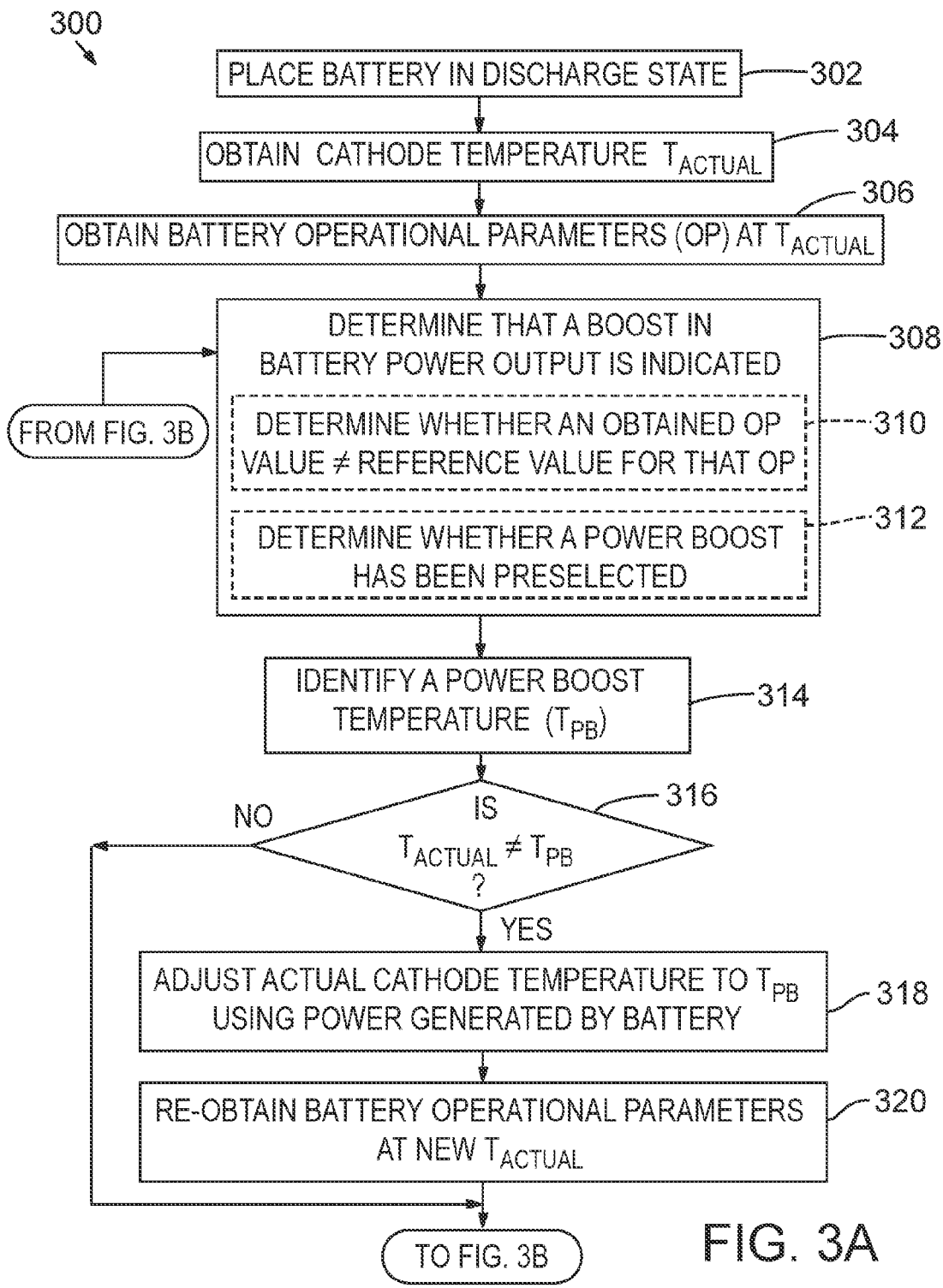
FIG. 3A is a portion of a flow chart for an embodiment of a method of adjusting the temperature of a metal-air battery power cell cathode using power collected from the power cell.
Figure 3B:
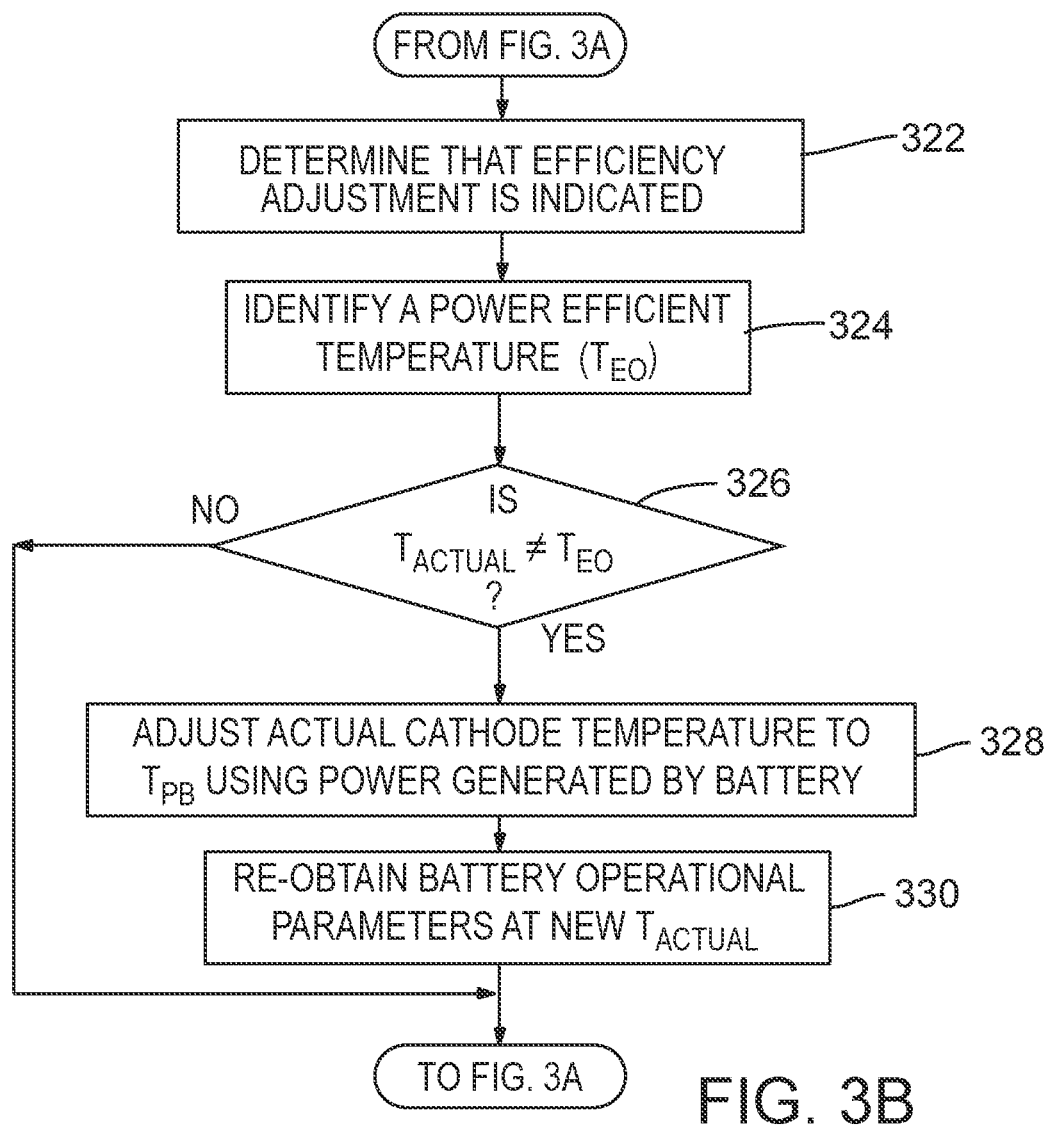
FIG. 3B is another portion of the flow chart shown in FIG. 3A.

FIGS. 3A and 3B are a flow chart for an embodiment of a method 300 for adjusting the temperature of a metal-air battery power cell cathode using power collected from the power cell. Skilled persons will appreciate that, in some embodiments, the processes described herein may be re-ordered, omitted, or supplemented without departing from the scope of the present disclosure. Moreover, it will be appreciated that embodiments of method 300 may be performed using any suitable hardware, including the hardware described herein.

At 302, method 300 includes placing the metal-air battery into a discharge state. In some embodiments, placing the metal-air battery into a discharge state may include completing an electrochemical circuit, where an electrical load is placed between an electrical ground and the anode, causing metal cations to be transported from the anode to the cathode through the battery separator where they are catalytically processed by the oxygen-reduction catalyst into a metal oxide.

At 304, method 300 includes obtaining the present, actual cathode temperature ($T_{actual}$). In some embodiments, determining $T_{actual}$ may include sensing the cathode temperature using a cathode temperature sensor in thermal communication with the cathode. In some embodiments, $T_{actual}$ may be estimated based on another sensed battery condition.

At 306, method 300 includes obtaining one or more battery operational parameters associated with steady-state operation at cathode temperature $T_{actual}$. Some operational parameters may be measured. An electrical potential difference between the anode and the cathode (i.e., battery voltage), a battery current, a battery power output (e.g., the amount of power available to an external load), a cathode temperature, and an ambient temperature are non-limiting examples of measured operational parameters. Other parameters, such as a battery discharge rate, a battery power delivery efficiency (e.g., amount of power available to the external load relative to the total power generated by the battery, including the power consumed by the cathode), and a battery capacity or lifetime, may be estimated or calculated for a given cathode temperature $T_{actual}$.

At 308, method 300 determines that a boost in power output from the battery is indicated. In some embodiments, boosting the power of the battery may be indicated by variation or deviation in one or more battery operation parameters during steady state operation. For example, a change in voltage across the power cell may indicate a decrease in power generation within the power cell. Adjusting the cathode temperature to trigger a power boost within the power cell may temporarily extend steady state power output from the battery. Thus, in some embodiments, 308 may include, at 310, determining whether a selected operational parameter is different from a reference value for that operational parameter at present cathode temperature $T_{actual}$. Put another way, at 310, method 300 determines whether there is a deviation of more than an acceptable amount (e.g., a measurement or calculation tolerance) between the actual value of a particular operational parameter and some pre-selected value for that parameter. Optionally, the reference value may include a user- or a programmatically provided set point that is intended to govern operation of the battery with respect to at least that operational parameter. In the voltage example provided above, deviation of the observed power cell voltage from a reference power cell voltage may trigger a power boost. As another example, a difference between a reference temperature (e.g., ambient temperature or battery target operational temperature) and a measured value for that temperature may also trigger a power boost condition.

In some embodiments, a user-selected power boost may be triggered. Thus, in some embodiments, 308 may include, at 312, determining whether a power boost has been preselected. For example, a user may provide a power boost level or a power output level. In such embodiments, preselecting a power boost may include identifying deviations between observed states and user-selected states, e.g., between observed power output levels and user-selected power output levels.

At 314, method 300 includes identifying a cathode temperature that will generate a power boost, e.g., a power boost temperature ($T_{pb}$), if such a temperature exists. Because the power used to adjust the temperature of the cathode to the power boost temperature is generated by the battery, the power capacity, or lifetime, of the battery may be penalized on adjustment. The lifetime of a battery may refer to any suitable duration, including the whole operational lifespan of the battery (e.g., until the battery is exhausted) or some shorter specified operational period (e.g., until a battery recharge interval). In some embodiments, projections of the battery lifetime penalty may be generated based on historical battery operation data, preselected battery charging schedules, and/or present battery operational conditions and parameters.

In some embodiments, identifying a power boost temperature may include identifying a power boost temperature at which value a projected short-term gain in power generation exceeds a projected long-term penalty in battery lifetime. Put another way, if no power boost level is specified, method 300 identifies a cathode temperature that will yield a net-positive value power boost for the battery. In some of such embodiments, identifying a power-boosted temperature may include utilizing a functional relationship between a positive value associated with the projected power boost and a negative value associated with the projected battery penalty to evaluate the power benefit relative to the lifetime penalty. Alternatively, if a power boost has been preselected, identifying a power boost temperature may include identifying a power boost temperature that will generate the selected power boost or power output level, if that power boost temperature exists. For example, a power boost temperature may be identified at which the metal-air battery generates a selected power boost relative to a present battery power level.

In some embodiments, identification of the power boost temperature may include identifying one or more candidate power boost temperatures and subsequently evaluating the candidate power boost temperature(s) to determine which, if any, of the candidate temperatures will be used as the power boost temperature. In some embodiments, candidate power boost temperatures may be identified using one or more process control models. Process control models may include correlative relationships linking catalyst performance, cathode temperature, and power output. Such relationships may be based historic battery performance data, theoretical modeling, or empirical modeling.

In some embodiments, candidate power boost temperatures may be evaluated with respect to one or more temperature existence conditions to verify operability of the battery at a particular temperature. Put another way, a candidate power boost temperature that does not satisfy a specified temperature existence condition may not be identified as a suitable power boost temperature. If no candidate power boost temperature satisfies the existence condition(s), it may be determined that no power boost temperature exists. In some embodiments, one or more of a battery deactivation temperature condition, a battery over-temperature condition, a catalyst runaway temperature condition, and a catalyst activation temperature condition may be used to evaluate whether a candidate power boost temperature may be identified as the power boost temperature.

Optionally, candidate power boost temperatures may be evaluated using a process search algorithm that identifies cathode temperatures yielding power boosts exceeding battery lifetime penalties or using an optimization routine that seeks improvements in power output and/or lifetime penalties, among other characteristics of battery performance. For example, identifying a candidate power boost temperature may include optimizing (e.g., maximizing) the projected power boost without exceeding a specified value of the projected battery lifetime penalty. As another example, identifying a power boost temperature may include maintaining a projected power boost at or above a specified value while minimizing the projected battery lifetime penalty.

Upon identification of the power boost temperature, at 316 method 300 determines whether the present, observed temperature of the cathode ($T_{actual}$) is different from the power boost temperature identified at 314. If there is no difference between the observed cathode temperature and the power boost cathode temperature, e.g., if no power boost temperature is identified, method 300 advances to an evaluation of battery efficiency, described in more detail below and illustrated in FIG. 3B. If there is a difference in the temperatures, method 300 advances to 318 and adjusts the temperature of the cathode to the power boost temperature using power generated by the battery (e.g., using current drawn from the battery).

In some embodiments, a cathode temperature controller may use the power boost temperature as a temperature set point to control the temperature of the cathode. Altering the cathode temperature alters the catalytic activity of the oxygen-reduction catalyst included in the cathode, and, in turn, the power generated by the battery. In one example, a heater powered by the battery and thermally coupled with the cathode may be controlled to such a set point temperature to heat the catalyst and achieve a given power boost. Once the cathode reaches steady-state operation at the power boost temperature, method 300 obtains battery operational parameters for $T_{pb}$ at 320. In some embodiments, the newly obtained battery operational parameters may be stored along with earlier-obtained values to track the operational history for the battery, refine a predictive operational model for the battery, and/or set a flag indicating an operational excursion for the battery.

Using power generated by the battery to adjust the temperature of the cathode may alter the efficiency with which the battery operates. For example, increasing cathode temperatures may increase the cathode resistance, so that subsequent action to raise the cathode temperature with resistive heating may require greater amounts of power. In some embodiments, the temperature of the cathode may be adjusted, using power generated by the battery, so that the battery operating efficiency satisfies one or more preselected efficiency criteria.

The efficiency (E) of a battery refers to, for a given temperature, the battery power output relative to the power cell discharge rate (e.g., power output by the power cell) at that temperature. In some embodiments, the efficiency may refer to an instantaneous efficiency determination. In some embodiments, efficiency may refer to battery efficiency over a preselected time period (e.g., a battery operating life or operating interval).

In the embodiment shown in FIG. 3B, at 322, method 300 determines that an adjustment to the battery operating efficiency is indicated. In some embodiments, an efficiency adjustment may be indicated by variation or deviation in one or more battery operation parameters during steady state operation. A variation between an observed value of a particular operational parameter (e.g., power cell voltage, battery power output, battery target operational temperature, or ambient temperature) and a pre-selected reference value for that parameter may trigger a change in cathode temperature to affect an efficiency adjustment. In some embodiments, a user-selected or user-specified battery efficiency target may indicate an efficiency adjustment.

At 324, method 300 identifies a power efficient operating temperature ($T_{eo}$) for the cathode. In some embodiments, identifying $T_{eo}$ may include identifying a temperature at which the power cell generates a projected efficient power boost that exceeds a projected battery efficiency penalty, where the efficiency penalty represents a decrease in efficiency projected to result from operation at a different temperature. In some embodiments, projections of the battery efficiency penalty may be generated based on historical battery operation data, and/or present battery operational conditions and parameters. Alternatively, if battery operating efficiency has been preselected, identifying a power efficient operating temperature may include identifying a temperature that will generate the selected efficiency, if that power efficient temperature exists. The projected efficient power boost may be different from the power boost discussed above.

In some embodiments, identification of a power efficient temperature may include identifying one or more candidate power efficient temperatures and subsequently evaluating the candidate power efficient temperature(s) to determine which, if any, of the candidate temperatures will be used as the power efficient temperature. In some embodiments, candidate power efficient temperatures may be identified using one or more process control models. Process control models may include correlative relationships linking catalyst performance, cathode temperature, and power output. Such relationships may be based on historic battery performance data, theoretical modeling, or empirical modeling.

In some embodiments, candidate power efficient temperatures may be evaluated with respect to one or more temperature existence conditions to verify operability of the battery at a particular temperature. Put another way, a candidate power efficient temperature that does not satisfy a specified temperature existence condition may not be identified as a suitable power efficient temperature. If no candidate power efficient temperature satisfies the existence condition(s), it may be determined that no power efficient temperature exists. In some embodiments, one or more of a battery deactivation temperature condition, a battery over-temperature condition, a catalyst runaway temperature condition, and a catalyst activation temperature condition may be used to evaluate whether a candidate power efficient temperature may be identified as the power efficient temperature.

Optionally, candidate power efficient temperatures may be evaluated using a process search algorithm that identifies cathode temperatures yielding power efficient boosts exceeding battery efficiency penalties or using an optimization routine that seeks improvements in power output and/or efficiency penalties, among other characteristics of battery performance. For example, identifying a candidate power efficient temperature may include optimizing (e.g., maximizing) the projected power efficient boost without exceeding a specified value of the projected battery efficiency penalty. As another example, identifying a power efficient temperature may include maintaining a projected power efficient boost at or above a specified value while minimizing the projected battery efficiency penalty.

Upon identification of the power efficient temperature, at 326, method 300 determines whether the present, observed temperature of the cathode ($T_{actual}$) is different from the power efficient temperature. If there is no difference between the observed cathode temperature and the power efficient cathode temperature (for example, if no power efficient temperature is identified), method 300 returns to 308 (FIG. 3A). If there is a difference in the temperatures, method 300 advances to 328 and adjusts the temperature of the cathode to the power efficient temperature using power generated by the battery.

In some embodiments, a cathode temperature controller may use the power efficient temperature as a temperature set point to control the temperature of the cathode. For example, a thermal electric cooler powered by the battery and thermally coupled with the cathode may be used to lower the temperature of the catalyst to the power efficient temperature. Once the cathode reaches steady-state operation at the power efficient temperature, method 300 obtains the battery operational parameters at 330. These operational parameters may be stored for other use. For example, stored parameters may be used to track the operational history for the battery, refine a predictive operational model for the battery, and/or set a flag indicating an operational excursion. Method 300 then returns to 308 (FIG. 3A), and continues monitoring the operational status of the battery.

It will be obvious to those having skill in the art that many changes may be made to the details of the above-described embodiments without departing from the underlying principles of the invention. The scope of the present invention should, therefore, be determined only by the following claims.

The invention claimed is:

1. A metal-air battery, comprising:
an electrochemically active anode that emits electrons and metal cations during a discharge state;
a cathode that includes an oxygen-reduction catalyst to catalytically process the metal cations into a metal oxide;
a battery separator that electrically isolates the anode from the cathode, the battery separator being permeable to metal cations and positioned between the anode and the cathode;
a cathode temperature sensor that is thermally coupled with the cathode and from which a present operating temperature of the cathode is obtained during the discharge state;
a cathode temperature controller that identifies a power-boosted operating temperature at which a projected power boost, relative to a present battery power, exceeds a projected battery penalty; and
a temperature regulator supplied with current generated by the metal-air battery to adjust the cathode temperature from the present operating temperature to the power-boosted operating temperature during the discharge state.

2. The metal-air battery of claim 1, further comprising an electrolyte, the battery separator being permeable to the electrolyte.

3. The metal-air battery of claim 1, further comprising a heat transfer structure thermally connecting the temperature regulator with the cathode.

4. The metal-air battery of claim 3, in which the heat transfer structure includes a solid phase thermal conductor.

5. The metal-air battery of claim 3, in which the heat transfer structure includes a heat pipe.

6. The metal-air battery of claim 3, in which the heat transfer structure includes a non-electrolyte fluid flow system.

7. The metal-air battery of claim 1, in which the projected battery penalty comprises a projected penalty over a specified time period.

8. The metal-air battery of claim 7, in which the specified time period corresponds to an operational lifetime of the battery.

9. The metal-air battery of claim 7, in which the battery penalty comprises a battery efficiency over the time period.

10. The metal-air battery of claim 1, in which the battery penalty comprises an operational lifetime of the battery.

11. The metal-air battery of claim 1, wherein identifying a power-boosted temperature comprises utilization of a functional relationship between a positive value associated with the projected power boost and a negative value associated with the projected battery penalty.

12. The metal-air battery of claim 1, wherein identifying a power-boosted temperature comprises maximizing the projected power boost while not exceeding a specified value of the projected battery penalty.

13. The metal-air battery of claim 1, wherein identifying a power-boosted temperature comprises maintaining the projected power boost at or above a specified value while minimizing the projected battery penalty.

14. The metal-air battery of claim 1, in which the cathode temperature controller identifies a power-efficient operating temperature at which a projected power boost exceeds a projected battery efficiency penalty, and in which the temperature regulator uses current collected from the battery during the discharge state to adjust the temperature of the cathode to power-efficient operating temperature.

15. The metal-air battery of claim 1, further comprising a resistive heater electrically connected with the temperature regulator and thermally coupled to the cathode to heat the cathode.

16. The metal-air battery of claim 1, further comprising a thermoelectric cooler electrically connected with the temperature regulator and thermally coupled to the cathode to cool the cathode.

17. The metal-air battery of claim 1, further comprising a refrigeration unit electrically connected with the temperature regulator and thermally coupled to the cathode to cool the cathode.

18. A method for adjusting power generation of the metal-air battery of claim 1 using current generated by the battery during battery discharge, the method comprising:
placing the metal-air battery in the discharge state;
during the discharge state, collecting current from the battery;
determining the present operating temperature for the cathode;
identifying the power-boosted temperature at which the projected power boost, relative to the present battery power, exceeds the projected battery penalty;
adjusting the temperature of the cathode to the power-boosted temperature using current collected from the battery to alter catalytic activity of the oxygen-reduction catalyst.

19. The method of claim 18, in which the projected battery penalty includes a projected penalty over a specified time period.

20. The method of claim 19, in which the specified time period corresponds to an operational lifetime of the battery.

21. The method of claim 19, in which the battery penalty includes a battery efficiency over the time period.

22. The method of claim 18, in which the battery penalty includes an operational lifetime of the battery.

23. The method of claim 18, in which identifying a power-boosted temperature includes utilization of a functional relationship between a positive value associated with the projected power boost and a negative value associated with the projected battery penalty.

24. The method of claim 18, wherein identifying a power-boosted temperature comprises maximizing the projected power boost while not exceeding a specified value of the projected battery penalty.

25. The method of claim 18, wherein identifying a power-boosted temperature comprises maintaining the projected power boost at or above a specified value while minimizing the projected battery penalty.

26. The method of claim 18, further comprising identifying the projected power boost using a positive correlation relating a power generation rate for the battery and a turnover frequency for the oxygen-reduction catalyst.

27. The method of claim 18, further comprising identifying the projected battery lifetime penalty using a negative correlation relating battery lifetime and cathode temperature.

28. The method of claim 18, further comprising:
identifying a power-efficient operating temperature at which a projected power boost exceeds a projected battery efficiency penalty; and
adjusting the temperature of the cathode to the power-efficient operating temperature.

29. The method of claim 18, in which determining the present cathode temperature includes sensing the cathode temperature using a cathode temperature sensor in thermal communication with the cathode.

30. The method of claim 18, further comprising identifying one of the projected power boost or the projected battery lifetime or both of them using historical battery data.

31. The method of claim 18, in which adjusting the cathode temperature includes heating the cathode using a resistive heater thermally coupled to the cathode.

32. The method of claim 18, in which adjusting the cathode temperature includes resistively heating the cathode by supplying current directly to the cathode.

33. The method of claim 18, in which adjusting the cathode temperature includes cooling the cathode using a thermoelectric cooler thermally coupled to the cathode.

34. The method of claim 18, in which adjusting the cathode temperature includes cooling the cathode using a refrigeration unit thermally coupled to the cathode.

35. A method for adjusting power generation of the metal-air battery of claim 1 using current generated by the battery during battery discharge, the method comprising:
placing the metal-air battery in the discharge state;
during the discharge state, collecting current from the battery;
determining the present operating temperature for the cathode;
identifying the power-boosted temperature at which the metal-air battery generates a selected power boost relative to the present battery power;
adjusting the temperature of the cathode to the power-boosted temperature using current collected from the battery to alter catalytic activity of the oxygen-reduction catalyst.

36. The method of claim 35, further comprising identifying the projected power boost using a positive correlation relating a power generation rate for the battery and a turnover frequency for the oxygen-reduction catalyst.

37. The method of claim 35, in which putting the metal-air battery into the discharge state includes:
transporting metal cations from the anode through the separator to the cathode; and
at the cathode, catalytically processing the metal cations with the oxygen-reduction catalyst.

38. The method of claim 35, further comprising:
identifying a power-efficient operating temperature at which a projected power boost exceeds a projected battery efficiency penalty; and
adjusting the temperature of the cathode to the power-efficient operating temperature.

39. The method of claim 35, further comprising identifying a projected battery lifetime penalty at the power-boosted temperature.

40. The method of claim 35, in which determining the present cathode temperature includes sensing the cathode temperature using a cathode temperature sensor in thermal communication with the cathode.

41. The method of claim 35, further comprising identifying the projected power boost using historical battery data.

42. The method of claim 35, in which adjusting the cathode temperature includes heating the cathode using a resistive heater thermally coupled to the cathode.

43. The method of claim 35, in which adjusting the cathode temperature includes resistively heating the cathode by supplying current directly to the cathode.

44. The method of claim 35, in which adjusting the cathode temperature includes cooling the cathode using a thermoelectric cooler thermally coupled to the cathode.

45. The metal-air battery of claim 1, wherein the cathode controller comprises:
a processor; and
a non-transitory computer-readable medium comprising instructions that, when executed by the processor, cause the processor to perform operations, the operations comprising:
identifying the projected power boost;
identifying the projected battery penalty; and
determining if the projected power boost, relative to the present battery power, exceeds the projected battery penalty.

* * * * *